(12) United States Patent
Harren et al.

(10) Patent No.: US 8,756,699 B1
(45) Date of Patent: Jun. 17, 2014

(54) COUNTING UNIQUE IDENTIFIERS SECURELY

(75) Inventors: Matt Harren, Fremont, CA (US); Krasimir Mitkov Dobrev, Sunnyvale, CA (US); Jason Douglas Waddle, Oakland, CA (US)

(73) Assignee: Google Inc., Mountain View, CA (US)

( * ) Notice: Subject to any disclaimer, the term of this patent is extended or adjusted under 35 U.S.C. 154(b) by 55 days.

(21) Appl. No.: 13/546,621

(22) Filed: Jul. 11, 2012

(51) Int. Cl.
 *G06F 21/00* (2013.01)
(52) U.S. Cl.
 USPC ............................................ 726/26; 713/189
(58) Field of Classification Search
 None
 See application file for complete search history.

(56) References Cited

U.S. PATENT DOCUMENTS

| | | | | |
|---|---|---|---|---|
| 6,031,390 | A * | 2/2000 | Fant et al. | 326/36 |
| 2002/0161904 | A1 * | 10/2002 | Tredoux et al. | 709/229 |
| 2004/0064693 | A1 * | 4/2004 | Pabla et al. | 713/168 |
| 2004/0243704 | A1 | 12/2004 | Botelho et al. | |
| 2006/0005259 | A1 * | 1/2006 | Isozaki et al. | 726/27 |
| 2011/0060905 | A1 | 3/2011 | Stack et al. | |
| 2011/0246568 | A1 | 10/2011 | Morimoto | |
| 2011/0258237 | A1 * | 10/2011 | Thomas | 707/803 |

OTHER PUBLICATIONS

Dean, Jeffrey, et al., "MapReduce: Simplified Data Processing on Large Clusters," USENIX Association, OSDI '04: 6th Symposium on Operating Systems Design and Implementation, pp. 137-149.
Pike, Rob, et al., "Interpreting the Data: Parallel Analysis with Sawzall," Scientific Programming, IOS Press, Jan. 5, 2006, pp. 277-298, vol. 13, No. 4.
Song, Dawn, et al., "Cloud Data Protection for the Masses," IEEE Computer Society, Jan. 2012, pp. 39-45.

* cited by examiner

*Primary Examiner* — Gilberto Barron, Jr.
*Assistant Examiner* — David Le
(74) *Attorney, Agent, or Firm* — Procopio, Cory, Hargreaves & Savitch LLP

(57) ABSTRACT

A number of unique identifiers is determined by, at a device, receiving a request to determine the number of unique identifiers, outputting a response to the request, and receiving data representing the number of the unique identifiers based on the response to the request. The data representing the number of the unique identifiers is free of information indicative of an identity of a source of the unique identifiers.

29 Claims, 5 Drawing Sheets

US 8,756,699 B1

COUNTING UNIQUE IDENTIFIERS SECURELY

BACKGROUND

1. Technical Field

The subject matter described herein relates to how an online service provider can safeguard activity information and identities of users. More specifically, it relates to a way to permit analysts to carry out statistical analysis of server log files without disclosing to the analysts activity information that reveals what particular users are doing and who the users are.

2. Background Information

To this point, the state-of-the-art approach has relied on field level access controls. Field level access controls are helpful in preventing an analyst from accessing data of a particular field. The fields that have unique identifier data, such as IP address, cookie ID, or the like, are the ones that are typically protected by the field level access controls. Varying levels of access have been used to make more or fewer fields available to analysts. Unfortunately, using field level access controls may not be the best approach to preventing analysts from accessing unique identifier data. For example, field level access controls may be cumbersome.

SUMMARY

The subject matter described herein involves a way for the online service provider to permit analysts to analyze the information reflected in log files, and at the same time to protect users from having their unique identifier data potentially revealed to the analysts. In particular, the subject matter described herein involves stripping away, replacing, or encrypting the information in the fields that contain the unique identifier data. The result is that the analyst is not provided with fields that contain actual unique identifier data of a user, thereby obviating the need for field level access controls.

According to an aspect of an example embodiment, there is provided a method for determining a number of unique identifiers. The method may include: at a device, receiving a request to determine the number of unique identifiers; outputting a response to the request; and receiving data representing the number of unique identifiers based on the response to the request. A non-transitory computer readable medium including executable instructions may also be provided for determining a number of unique identifiers in accordance with the foregoing method.

The data representing the number of the unique identifiers is free of information indicative of respective entities represented by the unique identifiers.

The unique identifiers may include internet protocol (IP) addresses or cookie identifiers. Also, the unique identifiers may correspond to unique users that fit within at least one category.

The unique identifiers may be encrypted to prevent identification of the unique users.

Also, the data representing the number of the unique identifiers may be nil when the number of the unique identifiers is below a number (e.g., a predetermined number) or threshold.

According to an aspect of another example embodiment, there is provided a system for determining a number of unique identifiers. The system may include: a client which sends a request to determine the number of the unique identifiers, and a server which stores data representing the unique identifiers. The data representing the number of the unique identifiers is received by the client free of information indicative of respective entities represented by the unique identifiers.

The unique identifiers may include internet protocol (IP) addresses and cookie identifiers.

The unique identifiers may correspond to unique users that fit within at least one specific category. The unique identifiers may also be encrypted to prevent identification of the unique users.

The data representing the number of the unique identifiers is nil when the number of the unique identifiers is below a number (e.g., a predetermined number) or threshold.

According to an aspect of yet another example embodiment, there is provided a client device for requesting a number of unique identifiers. The client device may include: an input unit configured to receive an input related to a request to determine the number of the unique identifiers; a transmitting unit which transmits the request to determine the number of the unique identifiers; and a receiving unit which receives data representing the number of the unique identifiers.

The data representing the number of the unique identifiers is free of information indicative of respective entities represented by the unique identifiers.

The unique identifiers may include internet protocol (IP) addresses or cookie identifiers. Also, the unique identifiers may correspond to unique users that fit within at least one specific category.

The unique identifiers may be encrypted to prevent identification of the unique users.

Also, the data representing the number of the unique identifiers is nil when the number of the unique identifiers is below a number (e.g., a predetermined number) or threshold.

According to an aspect of yet another example embodiment, there is provided a server unit for storing data representing unique identifiers. The server unit may include: a storing unit which stores the data representing the unique identifiers; a processor which executes a script to determine a number of the unique identifiers based on the data representing the unique identifiers; and an output unit which outputs the data representing the determined number of the unique identifiers.

The data representing the determined number of the unique identifiers may be free of information indicative of respective entities represented by the unique identifiers.

The unique identifiers may include internet protocol (IP) addresses or cookie identifiers. The unique identifiers may correspond to unique users that fit within at least one specific category, and may be encrypted to prevent identification of the unique users.

DETAILED DESCRIPTION

Figure 1:
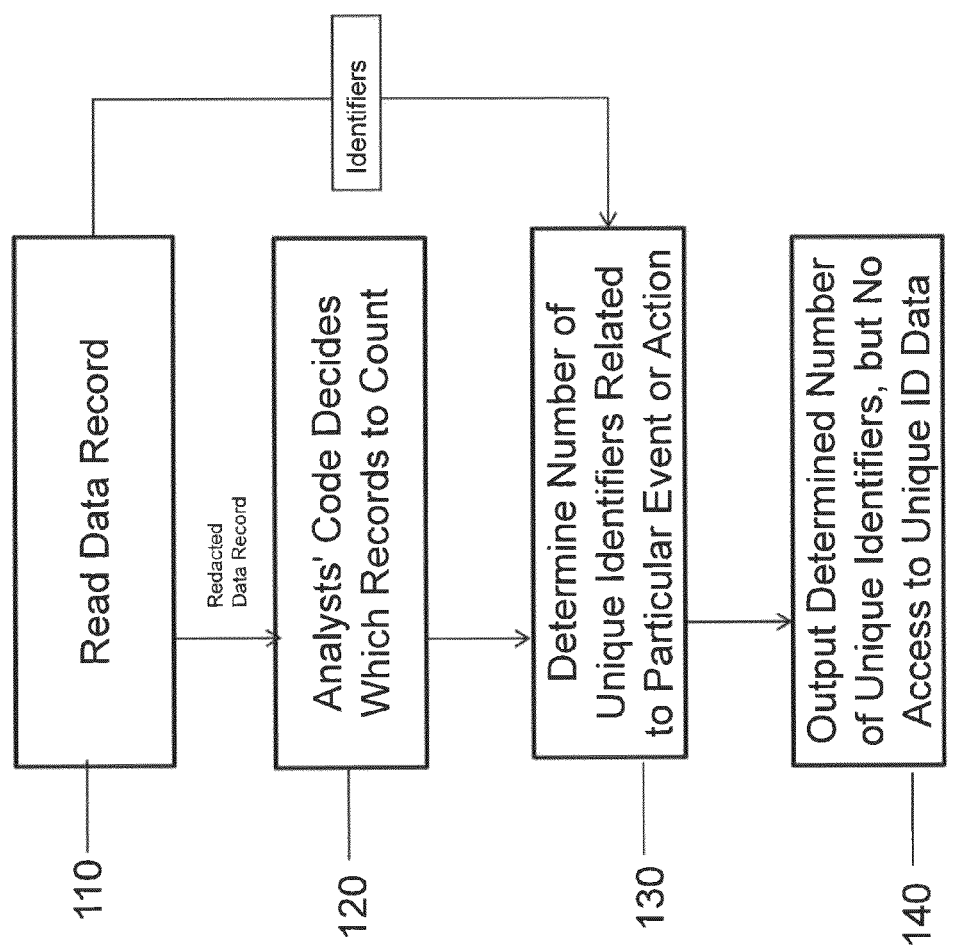
FIG. 1 is a flowchart of a method for counting a number of unique identifiers according to an example embodiment.

Hereinafter, example embodiments are described in greater detail along with reference to the accompanying drawings.

A responsible online service provider goes to great lengths to protect the private information of those who use its services. This principle includes the protection of activity information that reveals what particular users are doing and when they are doing it. Such activity information, however, can become vulnerable to discovery when analysts carry out statistical analysis of server log files. The activity information is benign if the analyst cannot determine the identity of any particular user that may be performing some activity. When the logs are captured, however, the logs themselves often contain identification information which can uniquely identify a particular person.

Log File Creation in General

Conventional software packages allow for statistical analysis and reporting of log files, using dynamic contextual filtering, 'live' data zooming, user interface customization, and custom calculated reports. Such software packages may incorporate real time reporting and real time alerting, and may provide for analysis of client requests to provide information on visitor traffic and on-site behavioral activity.

For example, users may visit a particular website or click on a website link within another website a number of times, for a specific purpose. An individual who seeks to gather information about the number of times the above-mentioned actions are performed or information about who is performing such actions, may utilize existing software to obtain such information.

It can be useful to identify the number of unique users that perform one or more of the above-mentioned actions, for statistical analysis purposes or some other reason. A unique user can be identified by a unique identifier such as, for example, an internet protocol (IP) address, cookie ID, globally unique identifier (GUID), universally unique identifier (UUID) or media access control (MAC) address. These identifiers can identify a unique user via a computing entity from which the user performs an action. Knowing the number of unique identifiers (i.e., unique users) that perform a particular action may be useful to many different companies throughout the world. For example, when studying a large dataset, data analysts need to be able to count unique users who match some criteria. The criteria may not be known ahead of time, so the data cannot be precomputed.

In a conventional system, a data analyst at a terminal makes a request, via the terminal, for a determination of the number of unique users that perform a particular action based on the unique identifier data. The terminal transmits the request to a server, which, in turn, can provide access to the unique identifiers for the purposes of quantifying the unique identifiers with respect to their respective actions, at the terminal or at the server. In both instances, the unique identifier data is accessible to the terminal of the data analyst and the data analyst.

Many of the existing software packages, however, do not provide a way for a data analyst to quantify the number of unique identifiers (users) that perform respective actions without allowing the data analyst or the computing device the analyst is working from, to have access to the unique identifier data. This presents a privacy dilemma in instances in which it is useful or necessary for a data analyst to have the quantified information related to a number of unique identifiers. However, at the same time, it is imperative that the analyst seeking the quantified information not have access to, or be able to discern, the particular unique identifiers.

Counting Unique Identifiers

According to an example embodiment, one approach to ensuring that the analyst cannot determine the identity of any particular user is to use an analytics software package together with a procedural domain-specific programming language such as, for example but not by way of limitation, the Sawzall programming language. Further information regarding the Sawzall programming language may be found in Pike, R. et al. "Interpreting the Data: Parallel Analysis With Sawzall" Scientific Programming, Vol. 13, No. 4 (2005), pp. 277-298, the entire disclosure of which is hereby expressly incorporated by reference herein.

An analytics software package may be specifically tailored to process large numbers of individual log records, and the performance of such packages can be extremely fast. By using this speed capability, the queries created by analysts can be handled very quickly at the server. The unique identifiers, which are necessary to create meaningful statistics, are not provided to the analyst who requested the information. Only the final counts are provided to the analyst. The procedural domain-specific programming language can be used to implement routines that remove or alter any particular unique identifier information prior to passing a response back to an analyst.

Similarly, the procedural domain-specific programming language can be used to carry out counting operations with respect to specific criteria given by the analyst. For example, the number of unique French users that perform a certain action can be counted at the server, without ever exposing the unique identifier information to the analyst. Only the result is passed back to the analyst.

There are a number of available analytics software packages available for log analysis, data processing and traffic monitoring. One of ordinary skill in the art would understand how to implement and program various analytics software packages to accomplish the artisan's objectives, including log analysis, data processing and traffic monitoring. The software packages may be implementing using various procedural domain-specific programming languages.

The analytics software packages can provide a counting vehicle for individuals, such as data analysts, to determine a number of unique identifiers (users), where the underlying unique identifiers are hidden from the analysts. Using one of the software packages, a data analyst may implement example embodiments to allow counting of unique identifiers without having access to the actual unique identifiers.

As indicated above, a procedural domain specific programming language, such as Sawzall, may be used to process large numbers of individual log records. As an example embodiment, Sawzall may be executed in an interpreter or via a just-in-time (JIT) compiler. However, a programming language other than Sawzall may be substituted therefor, as would be understood in the art.

Environments that require the storage of numerous search logs, which include data documenting actions performed by users, have a need for different tools to perform analysis of the data that constitutes the logs.

One useful tool in such an environment would enable one to count the number of unique identifiers that perform specific categories of actions. For example, further to the above example, one can count the number of unique French users that perform a certain action, for purposes of determining how to best market to French users. These types of queries can be informative to a person needing this information. By counting the unique number of users, one can avoid counting duplicates of the same user.

A data analyst may invoke an application to run a script to determine the number of unique identifiers (users) that perform a specific function.

However, neither the application nor the data analyst would have access to specific unique identifiers, thereby protecting the privacy of the individuals that are reflected in the unique identifiers.

An application may run a script for the purpose of counting a number of unique users that perform a particular action based on data in a data log. The script may be passed to a server, which first checks that the data analyst and/or the invoked application has the access level to access the log to be analyzed.

The server may run the program on behalf of the data analyst.

According to an aspect of an example embodiment, the script itself does not get access to the data representing the unique identifier—the data being, for example, an IP address or a cookie ID. The unique identifier field may be cleared before it is accessible to the script.

Albeit inaccessible by the data analyst or the invoked application, a compiler may have access to the unique identifier and may feed it directly into a server for counting the number of unique identifiers.

The compiler will run the script written by the data analyst on each record, after removing identifiers and other sensitive data. The identifiers necessary for counting unique users remain stored in a part of random access memory (RAM) that is inaccessible to the script. The type safety of the programming language may ensure that the script cannot read sensitive data from RAM. If a programming language that does not enforce memory safety is used, a different sandboxing mechanism would be required.

The analyst's program decides whether or not to count the current record (e.g., in the example indicated above, the program would determine whether the record is from a French-speaking user). If so, the program signals to the compiler. The programming language retrieves the identifiers from its protected section of RAM, and feeds the data to a routine that processes identifiers and estimates how many unique users are in the set.

A single job may simultaneously work with many different identifiers (IP addresses, cookies, etc.) and count many different sets of users (such as users of each language, or from each country). Therefore, when the data analyst's program finds a record that it wants to count, the program communicates this information to the programming language which identifier to use and which set to put the identifier into.

One with ordinary skill in this field would understand that the various software packages and programming languages may be able to be employed to effectively implement example embodiments as described herein and with reference to the figures as set forth below.

Referring to FIG. 1, according to an example embodiment, a process for counting a number of unique identifiers is illustrated. At operation 110, data representing unique identifiers may be obtained for a purpose of determining a number of unique identifiers. At operation 120, after receiving a redacted version of the data record, analysis code may determine which records to count. At operation 130, the number of unique identifiers may be determined based on the obtained data representing unique identifiers. The number of the unique identifiers may be output at operation 140, without allowing the requestor of the number of unique identifiers to access, or have access to, the data representing the unique identifiers; that is, the data representing the number of the unique identifiers would be free of information indicative of respective entities represented by the unique identifiers. It should be noted that at operation 120, there is no access to the identifiers themselves.

Figure 2:
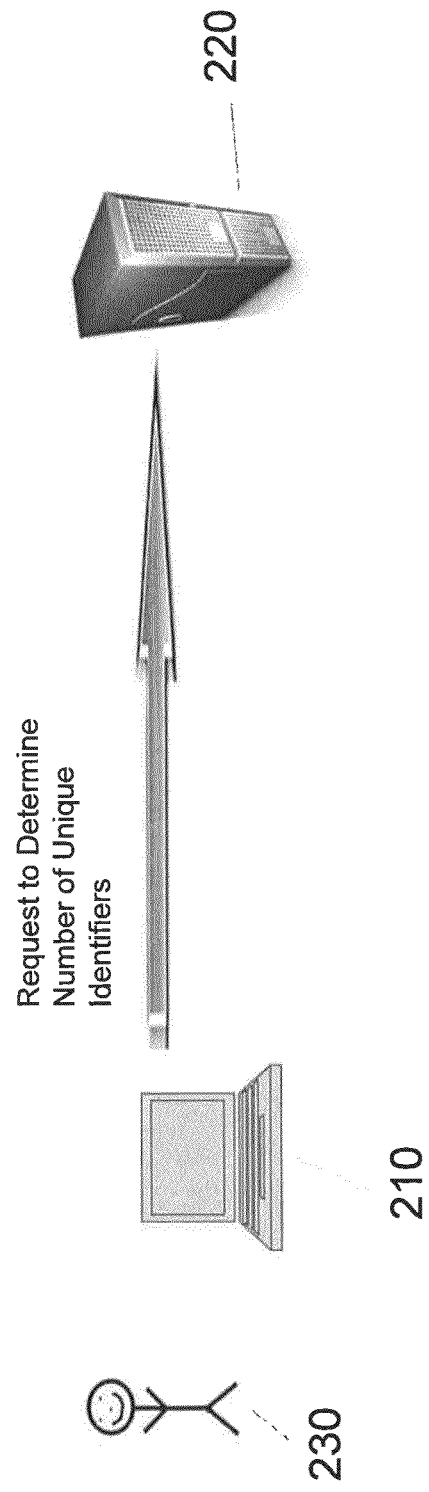
FIG. 2 is a view illustrating a system for counting unique identifiers according to an example embodiment.

FIG. 2 shows nodes in a system for counting unique identifiers according to the example process of FIG. 1.

Referring to FIG. 2, a client device 210 sends a request to determine the number of unique identifiers based on the input of a user. The server 220 stores data representing the unique identifiers. The term "server" may include one or more processor devices and may use distributed systems. In FIG. 2, the number of unique identifiers is output to a user 230 at the client device 210. Neither the client device 210 nor the user 230 accesses or has access to the data representing the unique identifiers.

Figure 3:
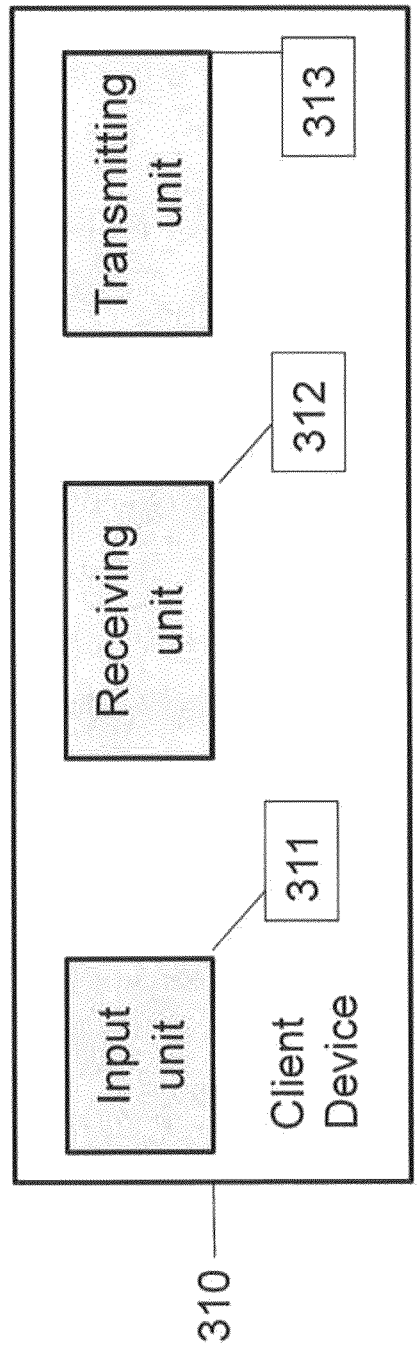
FIG. 3 is a block diagram illustrating a client device according to an example embodiment.

Referring to FIG. 3, a client device 310 may include an input unit 311 which receives an input related to a request to determine a number of unique identifiers. For example, an analyst may provide the input related to the request. The client device 310 further includes a transmitting unit 313 that transmits to a server the requests to determine the number of unique identifiers, and a receiving unit 312 that receives from the server data representing the number of unique identifiers. Neither the client device 310, nor the user of the client device 310, can access the data representing the unique identifiers.

Figure 4:
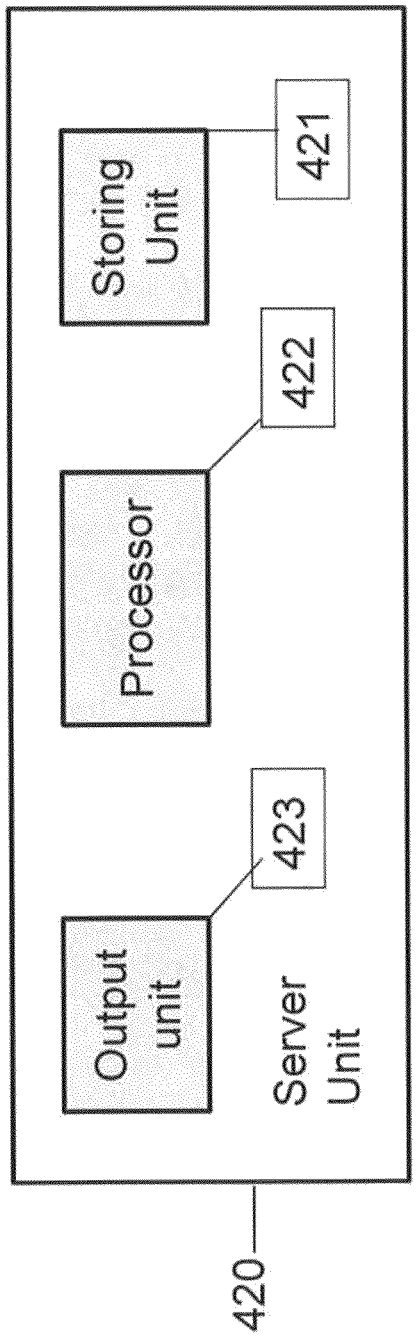
FIG. 4 is a block diagram illustrating a server unit according to an example embodiment.

FIG. 4 illustrates a block diagram of a server unit 420 for storing data representing unique identifiers. The server unit 420 includes a storing unit 421 which stores the data representing the unique identifiers received from the client, a processor 422 which executes a script to determine a number of the unique identifiers, based on the data representing the unique identifiers, and an output unit 423 which outputs the determined number of unique identifiers to the client. However, in an alternative example embodiment, the data representing the unique identifiers themselves, which are associated with the number of the unique identifiers, are not permitted to be output; that is, the data representing the number of the unique identifiers are free of information indicative of respective entities represented by the unique identifiers.

Alternatively, if the data representing the unique identifiers are output from the server unit, this data are not accessible by a user that requested the number of unique identifiers, or the device used to make the request.

Although a system having several nodes or devices is described above, one of ordinary skill in the art would appreciate that example embodiments may be implemented via: a single device; a single device via remote control; a cloud environment; and/or other environments in which computing and calculations are permitted.

Encryption Approach Encrypting the Unique Identifiers

According to an example embodiment, when unique identifiers are output from a server unit, they can be transmitted for storing in tables for use in calculating the number of unique identifiers, but not used in any other way. The unique identifiers may be transmitted via mill files, which are the output of the script for determining a number of unique identifiers.

The unique identifiers may be encrypted and stored in the tables. For example, a key store may be used to generate keys for each mill file containing data representing unique identifiers. Encrypting the entire table is not practical and may not be desirable if the table contains a significant amount of data that do not need to be encrypted.

Some possible considerations for the encryption include, but are not limited to:
1) Tying the encrypted data to the specific input data that the encrypted data were derived from. This allows the system to impose policies regarding which data sets can be joined with other data sets;
2) Making encryption deterministic;

3) Ensuring the encrypted value is mostly opaque. That is, analysis of the encrypted data should not provide any more information than can be obtained from application programming interfaces; and 4) Using a different key for encryption for each mill file, which prevents the accidental disclosure of a single key from compromising all of the encrypted data.

Encryption is necessary for many reasons when counting unique identifiers according to exemplary embodiments, including when saving and transporting partial results during the processing of a job. For example, it is not always possible for an analyst to run a complete analysis in one job, so a mechanism for data analysts to save the results of a partial analysis may be provided. That is, if an analyst needs to count a number of people who used both System A and System B, and if data from the two systems are stored in different locations, it may not be possible to analyze all of the data at once. Analysts may export a "mill file" containing the state of the job after reading from System A, so that the analysts can transport this file to System B to finish the analysis.

The mill file may represent the output of operation 130 in FIG. 1. Because the programming language's internal state makes use of sensitive identifiers, the mill file is encrypted. As a result, the analyst can be responsible for storing or transporting the file as needed, yet not be able to read the stored identifiers.

Minimum Threshold Approach: Limitations on Outputting Number of Identifiers

By constructing a query that matches a small number of log entries, an analyst may attempt to make some determinations using reverse engineering and/or reverse investigation.

According to an example embodiment, a minimum threshold approach helps prevent the analyst from being able to subvert the protections mentioned above in situations where the number of matching log entries is small.

According to an aspect of an example embodiment, it is made particularly more difficult to tie specific actions of a same user together to identify the particular user. This is achieved by not reporting or outputting the number of unique identifiers in response to a request for such information, if the number is below a number (e.g., a predetermined number) or threshold. Such omission may avoid a requestor or third party entity that has access to the requested number from determining via reverse engineering and/or reverse investigation the identities of users who have performed specific actions.

As an example of how a particular individual may be tied to a specific set of actions, consider the hypothetical that a request is made to determine the number of users that performed actions X and Y. If one knows that a particular user or entity A performed action X at a particular time, and there are relatively few users/entities that have performed action X, one may be able to deduce that user or entity A has performed action Y by requesting information on the number of users that have performed action X at the particular time and action Y.

According to an example embodiment, in the above-given hypothetical, the number of unique identifiers may not be output if the number of users that have performed action X is below the number (e.g., predetermined) or threshold, in an effort to provide an even stronger mechanism for keeping the unique identifiers private. Further, a small amount of error may be randomly added to the number of unique identifiers (e.g., random fuzzing) as an additional measure to protect the privacy of users.

Implementation

Having described example embodiments, the encryption approach, and the minimum threshold approach, and having disclosed a client system and a server system, there are some particular implementation details that can be handled in a number of different ways. To avoid possible misconceptions, the description below is included to help the person familiar with this field (e.g., one of ordinary skill in the art) to appreciate the fact that the client and the server are implemented, in a concrete way, as one or more computers.

A general example of a computer that can be used in accordance with the above-described embodiment will be described below.

Figure 5:
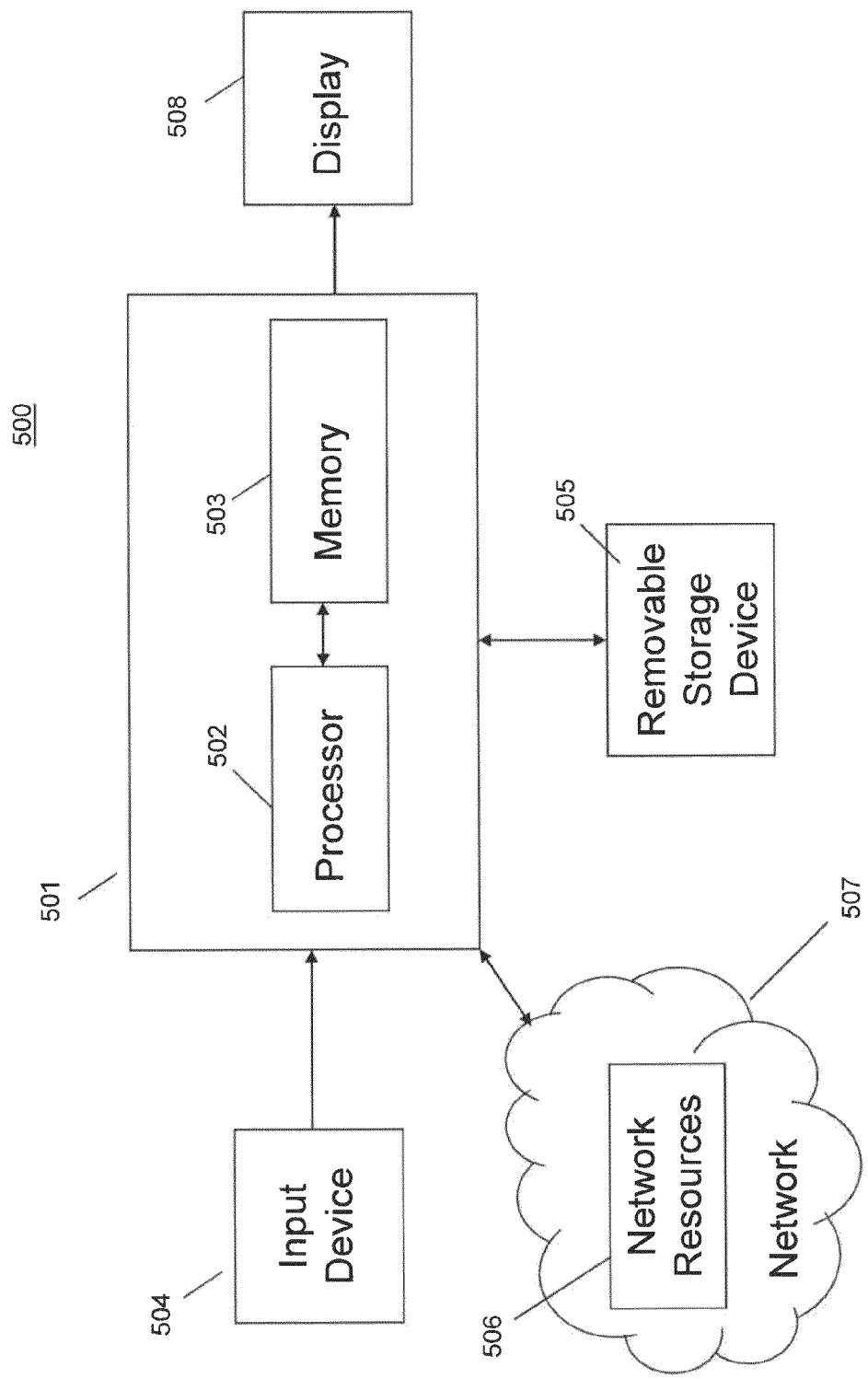
FIG. 5 is an example embodiment of a computer/server system.

FIG. 5 is a block diagram that illustrates an example embodiment of a computer/server system 500 upon which an example embodiment may be implemented. The system 500 includes a computer/server platform 501 including a processor 502 and memory 503 which operate to execute instructions, as known to one of skill in the art. The term "computer-readable medium" as used herein refers to any medium that participates in providing instructions to processor 502 for execution. Modules or software units described throughout the specification may also be executed by the processor 502.

Additionally, the computer platform 501 receives input from a plurality of input devices 504, such as a keyboard, mouse, touch device or verbal command. The computer platform 501 may additionally be connected to a removable storage device 505, such as a portable hard drive, optical media (CD or DVD), disk media or any other medium from which a computer can read executable code. The computer platform may further be connected to network resources 506 which connect to the Internet or other components of a local public or private network. The network resources 506 may provide instructions and data to the computer platform from a remote location on a network 507.

The connections to the network resources 506 may be via wireless protocols, such as e.g., the 802.11 standards or cellular protocols, or via physical transmission media, such as cables or fiber optics. The network resources may include storage devices for storing data and executable instructions at a location separate from the computer platform 501. The computer interacts with a display 508 to output data and other information to a user, as well as to request additional instructions and input from the user. The display 508 may therefore further act as an input device 504 for interacting with a user.

The computer may include one or more processors or processing units, a system memory and a bus that couples various system components comprising the system memory to processors. The bus can be one or more of any of several types of bus structures, comprising a memory bus or memory controller, a peripheral bus, an accelerated graphics port and a processor or local bus using any of a variety of bus architectures. The system memory comprises read only memory (ROM) and random access memory (RAM). A basic input/output system (BIOS) containing the routines that help to transfer information between elements within the computer, such as during boot up, is stored in the ROM or in a separate memory.

The computer further comprises a hard drive for reading from and writing to one or more hard disks. Some computers can comprise a magnetic disk drive for reading from and writing to a removable magnetic disk and an optical disk drive for reading from or writing to a removable optical disk, such as a CD ROM or other optical media. The hard drive, the magnetic disk drive and the optical disk drive are connected to the bus by an appropriate interface. The drives and their associated non-transitory computer-readable media provide nonvolatile storage of computer-readable instructions, data structures, program modules and other data for the computer.

Although the example environment described herein employs a hard disk, a removable magnetic disk and a removable optical disk, it should be appreciated by those skilled in the art that other types of non-transitory computer-readable media which can store data that is accessible by a computer, such as magnetic cassettes, flash memory cards, digital video disks, random access memories (RAMs), read only memories (ROMs), etc. may also be used in the example operating environment. In addition, carrier waves, etc., may also be used as computer-readable media which can store data that is accessible by a computer.

A number of program modules may be stored on the hard disk, magnetic disk, optical disk, ROM or RAM, comprising an operating system, at least one or more application programs, other program modules and program data. In some computers, an operator might enter commands and information into the computer through input devices such as a keyboard and a pointing device. Other input devices may comprise a microphone, a joystick, and/or a scanner. In some instances, however, a computer might not have these types of input devices.

These and other input devices are connected to the processing unit through an interface coupled to the bus. In some computers, a monitor or other type of display device might also connect to the bus via an interface, such as a video adapter. Some computers, however, may not have these types of display devices. In addition to the monitor, the computers might comprise other peripheral output devices such as speakers and printers.

The computer may operate in a networked environment using logical connections to one or more remote computers. The remote computer may be another personal computer, a server, a router, a network PC, a peer device or other common network node, and typically comprises many or all of the elements described above relative to the computer. The logical connections to the computer may comprise a local area network (LAN) and a wide area network (WAN). Such networking environments are commonplace in offices, enterprise-wide computer networks, intranets, and the Internet.

When used in a LAN networking environment, the computer is connected to the local network through a network interface or adapter. When used in a WAN networking environment, the computer typically comprises an adapter or other means for establishing communications over the wide area network, such as the Internet. The adapter, which may be internal or external, is connected to the bus via a serial port interface.

In a networked environment, program modules depicted relative to the computer, or portions thereof, may be stored in the remote memory storage device. It will be appreciated that the network connections described are examples and other means of establishing a communications link between the computers may be used.

Generally, the data processors of the computer are programmed by means of instructions stored at different times in the various computer-readable storage media of the computer. Programs and operating systems may be distributed, for example, on floppy disks or CD-ROMs. From there, they may be installed or loaded into the secondary memory of the computer. At execution, they are loaded at least partially into the computer's primary electronic memory. Non-limiting example embodiments described herein comprise these and other various types of computer-readable storage media when such media contain instructions or programs for implementing the steps described below in conjunction with a microprocessor or other data processor. Example embodiments also comprise the computer itself when programmed according to the methods and techniques described below.

Although a few example embodiments have been shown and described, it will be appreciated by those skilled in the art that changes may be made in these example embodiments without departing from the principles and spirit of the inventive concept as defined in the appended claims and their equivalents.

The inventive concept may be embodied in various forms without being limited to the example embodiments set forth herein; rather, these example embodiments are provided so that this disclosure will be thorough and complete, and will fully convey the inventive concept to people who are familiar with this field. Also, well known functions or constructions are not described in detail since they would obscure the application with the unnecessary detail. However, example embodiments can be practiced without those specifically defined matters.

What is claimed is:

1. A computer-implemented method for determining a number of unique identifiers, the method comprising:
   at a device, receiving a request to determine the number of the unique identifiers, the request comprising redacted data record void of identifiers;
   reading data representing a plurality of identifiers;
   determining the number of unique identifiers based on the redacted data record and the data representing the plurality of identifiers; and
   outputting a response to the request comprising data representing the number of unique identifiers;
   wherein the data representing the number of the unique identifiers is free of information indicative of respective users represented by the unique identifiers.

2. The method according to claim 1, wherein the unique identifiers comprise internet protocol (IP) addresses.

3. The method according to claim 1, wherein the unique identifiers comprise cookie identifiers.

4. The method according to claim 1, wherein the unique identifiers correspond to unique users that fit within at least one specific category.

5. The method according to claim 1, wherein the unique identifiers are encrypted, and the respective users comprise unique users.

6. The method according to claim 1, wherein the data representing the number of the unique identifiers is nil when the number of the unique identifiers is below a threshold.

7. A system for determining a number of unique identifiers, the system comprising:
   a server which receives from a client a request to determine the number of the unique identifiers, the request comprising redacted data record void of identifiers;
   reads data representing a plurality of identifiers;
   determines the number of unique identifiers based on the redacted data record and the data representing the plurality of identifiers; and
   sends data representing the number of unique identifiers to the client;
   wherein the data representing the number of the unique identifiers is free of information indicative of respective users represented by the unique identifiers.

8. The system according to claim 7, wherein the unique identifiers comprise internet protocol (IP) addresses.

9. The system according to claim 7, wherein the unique identifiers comprise cookie identifiers.

10. The system according to claim 7, wherein the unique identifiers correspond to unique users that fit within at least one specific category.

11. The system according to claim 7, wherein the unique identifiers are encrypted, and the respective users comprise unique users.

12. The system according to claim 7, wherein the data representing the number of the unique identifiers is nil when the number of the unique identifiers is below a threshold.

13. A client device for requesting a number of unique identifiers, the client device comprising a processor configured to:
- receive an input related to a request to determine the number of the unique identifiers;
- transmit the request to determine the number of the unique identifiers, the request comprising redacted data record void of identifiers; and
- receive data representing the number of the unique identifiers, wherein the number of unique identifiers is determined based on the redacted data record and data representing a plurality of identifiers not provided by the client device;
- wherein the data representing the number of the unique identifiers is free of information indicative of respective users represented by the unique identifiers.

14. The client device according to claim 13, wherein the unique identifiers comprise internet protocol (IP) addresses.

15. The client device according to claim 13, wherein the unique identifiers comprise cookie identifiers.

16. The client device according to claim 13, wherein the unique identifiers correspond to unique users that fit within at least one specific category.

17. The client device according to claim 13, wherein the unique identifiers are encrypted, and the respective users comprise unique users.

18. The client device according to claim 13, wherein the data representing the number of the unique identifiers is nil when the number of the unique identifiers is below a threshold.

19. A server, comprising:
- a storage which stores data representing a plurality of identifiers; and
- a processor which:
  - receives a request to determine a number of the unique identifiers, the request comprising redacted data record void of identifiers;
  - reads at least a portion of the data representing the plurality of identifiers
  - determines the number of the unique identifiers based on the redacted data record and the data representing the plurality of identifiers; and
  - outputs data representing the determined number of the unique identifiers;
- wherein the data representing the determined number of the unique identifiers is free of information indicative of respective users represented by the unique identifiers.

20. The server according to claim 19, wherein the unique identifiers comprise internet protocol (IP) addresses.

21. The server according to claim 19, wherein the unique identifiers comprise cookie identifiers.

22. The server according to claim 19, wherein the unique identifiers correspond to unique users that fit within at least one specific category.

23. The server according to claim 19, wherein the unique identifiers are encrypted, and the respective users comprise unique users.

24. A non-transitory computer readable medium including executable instructions for determining a number of unique identifiers, the instructions comprising:
- receiving a request to determine the number of unique identifiers, the request comprising redacted data record void of identifiers;
- reading data representing a plurality of identifiers;
- determining the number of unique identifiers based on the redacted data record and the data representing the plurality of identifiers; and
- outputting a response to the request comprising data representing the number of unique identifiers; and
- wherein the data representing the number of the unique identifiers is free of information indicative of respective users represented by the unique identifiers.

25. The non-transitory computer readable medium according to claim 24, wherein the unique identifiers comprise internet protocol (IP) addresses.

26. The non-transitory computer readable medium according to claim 24, wherein the unique identifiers comprise cookie identifiers.

27. The non-transitory computer readable medium according to claim 24, wherein the unique identifiers correspond to unique users that fit within at least one specific category.

28. The non-transitory computer readable medium according to claim 24, wherein the unique identifiers are encrypted, and the respective users comprise unique users.

29. The non-transitory computer readable medium according to claim 24, wherein the data representing the number of the unique identifiers is nil when the number of the unique identifiers is below a threshold.

* * * * *